United States Patent [19]
Reznikov et al.

[11] Patent Number: 5,570,984
[45] Date of Patent: Nov. 5, 1996

[54] ¼ TURN FASTENER

[75] Inventors: Naum Reznikov, Fremont; John C. Nuttall, deceased, late of San Jose, both of Calif., by Brenda Nuttall, legal representative

[73] Assignee: Sun Microsystems, Inc., Mountain View, Calif.

[21] Appl. No.: 417,212

[22] Filed: Apr. 5, 1995

[51] Int. Cl.⁶ .............................. F16B 21/00; F16B 39/00
[52] U.S. Cl. ............................ 411/551; 411/553; 411/946
[58] Field of Search ................................. 411/549, 550, 411/551, 552, 553, 511, 946

[56] References Cited

U.S. PATENT DOCUMENTS

| | | | |
|---|---|---|---|
| 2,399,750 | 5/1946 | Marty | 411/550 |
| 3,554,075 | 1/1971 | Johnson | 411/549 X |
| 3,709,086 | 1/1973 | Johnson | 411/551 |

OTHER PUBLICATIONS

Fast DZUS Fasteners—date unknown but more than one year prior to filing of application.
Camloc ¼ Turn Fasteners—date unknown but more than one year prior to filing of application.
Metal Coatings Intl., Inc.—date unknown but more than one year prior to filing application.
Electro Space Fabrications, Inc.—date unknown but more than one year prior to filing application.

*Primary Examiner*—Neill R. Wilson
*Attorney, Agent, or Firm*—Julian Caplan, Esq.; Flehr, Hohbach, Test, Albritton & Herbert

[57] ABSTRACT

A combination of a plastic part and metal part functions as a fastener to attach a panel to the flange of a portion of a chassis for electronic equipment or the like. The panel is formed with a counterbored hole and has an arcuate groove outside the counterbore on the outside of the panel and angularly spaced dimples on the underside. The fastener is a peripherally flanged hollow cylindrical member fitting into the hole and counterbore. It has a partially closed bottom and opposed openings in the cylindrical walls. A detent slants upward-outward from the bottom through one of the openings. A metal clip attaches to the cap, having an inverted U-shape having a web and two depending sides which fit through the openings. The top has a shoulder which locks outside the detent to hold the parts assembled and has a locking extension beyond the shoulder. One of the sides has an arcuate arm approximately in the plane of the top having a dimple which engages the dimples on the underside of the panel to hold the fastener in positions of adjustment. The cap has a transverse partition with its bore formed with a screwdriver slot aligned with an enlarged similar slot in the top of the clip. Thus the fastener may be turned to a position where the projection of the top of the clip engages under the flange of the chassis.

21 Claims, 3 Drawing Sheets

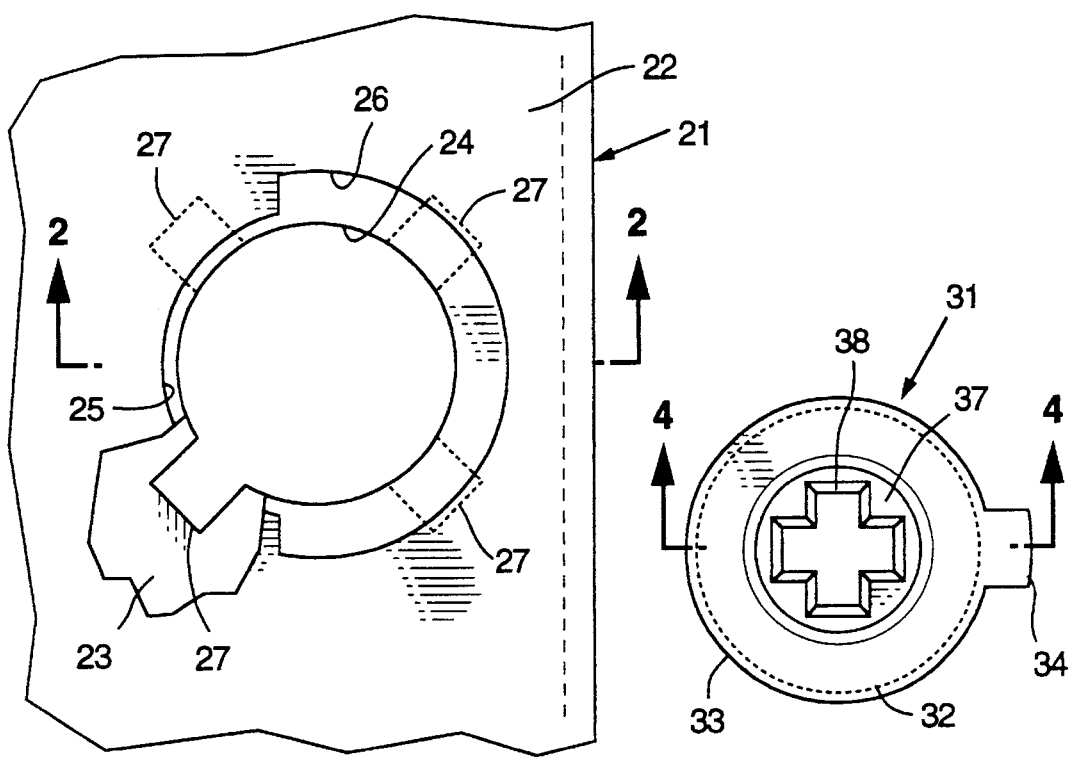
FIG. 1
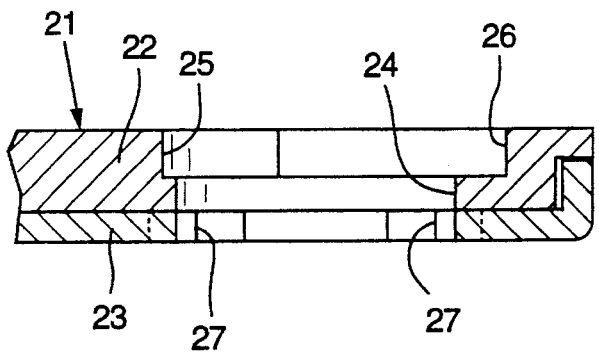
FIG. 2
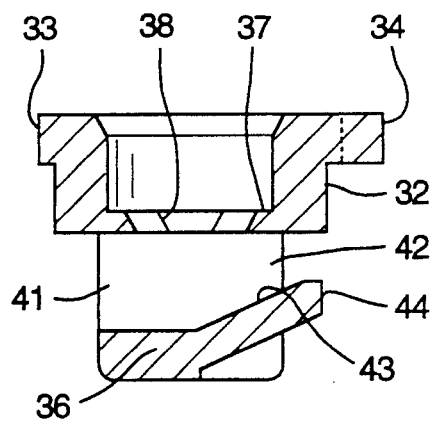
FIG. 3
FIG. 4
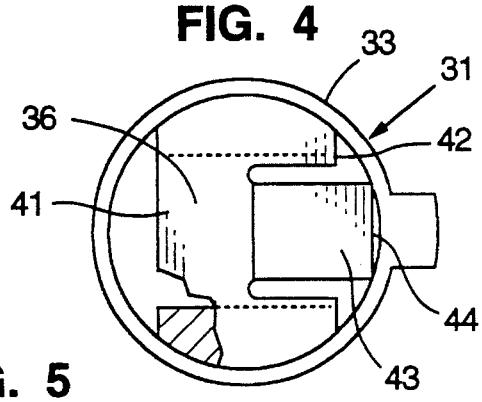
FIG. 5

¼ TURN FASTENER

BACKGROUND OF THE INVENTION

1. Field of the Invention

This invention relates to a new and improved ¼ turn fastener. More particularly, the invention relates to a fastener used to attach a panel to the chassis of a cabinet for electronic equipment.

2. Prior Art

¼ turn fasteners have been used in the art. In some of these fasteners a stud is formed with a spiral cam which engages a spring wire receptacle on the chassis in a bayonet-lock system. In another fastener the stud is formed with diametrically protruding pins which fit into a receptacle formed with a cam. In other fasteners a stud snaps into an apertured leaf spring receptacle attached to the chassis. In still another type of existing fastener, a collar screw fits into a plastic sleeve in the retainer.

The present invention has considerable advantages over all known ¼ turn fasteners.

SUMMARY OF THE INVENTION

By use of the fastener which is the subject of this application for patent, a panel such as the rear panel of a housing for electronic equipment is attached to the edge of a flange of the chassis of the equipment. The panel is formed with a hole to receive the fastener. The outside of the panel is formed with an arcuate recess which limits the of turning of the fastener. The underside of the panel is preferably formed with dimples (e.g., four) into which a dimple in the metal portion of the fastener fits to hold the fastener in different angular positions.

The fastener consists of two portions; namely, a plastic portion having a radial indicator fitting into the groove in the outside of the panel, a hollow cylindrical portion which fits into the hole in the panel and has a bottom from which a detent angles upwardly outwardly. Diametric slots are formed in the hollow cylindrical portion. A spring metal member fits into the plastic portion of the fastener extending through the diametric slots in the cylindrical portion. One end of the metal portion is formed with a shoulder behind which the end of the slanted detent of the plastic member fits to detachably lock the metal portion and plastic portion together. Beyond the shoulder the metal portion has a lock extension fitting under the chassis flange. The metal portion at its opposite end has an arcuate arm having a dimple which fits into any of the dimples in the underside of the panel.

In order to turn the fastener from unlocked to locked position, the plastic portion of the assembly has a partition across the bore thereof formed with a cross into which a Phillips screwdriver fits. Immediately below the partition in the plastic member, the metal member has a web joining the two sides of the metal member. The web is likewise formed with a cross to receive a Phillips screwdriver.

In the assembly of the device, the plastic member is inserted in the hole in the panel, the indicator fitting into the arcuate slot in the top of the panel. The metal member is then slipped through the aligned diametrically opposed slots in the hollow cylindrical portion of the plastic member until the shoulder on the metal member slips into place outside the outer end of the slanted detent of the plastic member.

With the protruding portion of the metal member disengaged from the flange of the chassis, the user inserts a screwdriver through the aligned slots in the plastic and metal members and turns the assembly ¼ turn. This brings the lock extension of the metal member into position underneath the flange of the chassis, securing the panel to the chassis. The detent in the metal member has thereby moved into one of the dimples in the underside of the panel to hold the parts in position against unintentional alignment. The present position of the fastener is shown by the indicator on the exterior of the panel.

To remove the panel from the chassis, the operations are simply reversed.

Accordingly the present invention has the advantage of a combination of plastic and metal parts. The plastic part is inexpensive and can be colored to match the color of the panel, if desired. The indicator on the plastic portion tells the user in which direction to turn the fastener and also prevents overturning since the arcuate length of the depression in the top of the panel limits turning of the indicator and hence turning of the fastener.

The fact that a portion of the fastener is of metal improves the life of the fastener and also insures the corners of the Phillips screwdriver slot are not broken off, as might occur if a softer material were employed.

Other advantages of the invention are the fact it is easy to install and also that it is easy to lock and unlock the fastener.

BRIEF DESCRIPTION OF THE DRAWINGS

The accompanying drawings, which are incorporated in and form a part of this specification, illustrate embodiments of the invention and, together with the description, serve to explain the principles of the invention:

FIG. 1 is a fragmentary plan view of the outside of the panel in which the present invention is installed.

FIG. 2 is a vertical sectional view taken substantially along the line 2—2 of FIG. 1.

FIG. 3 is a top plan view of the plastic cap.

FIG. 4 is a vertical sectional view taken substantially along the line 4—4 of FIG. 3.

FIG. 5 is a bottom plan view of the structure of FIGS. 3 and 4.

DETAILED DESCRIPTION OF THE PREFERRED EMBODIMENTS

Figure 6:
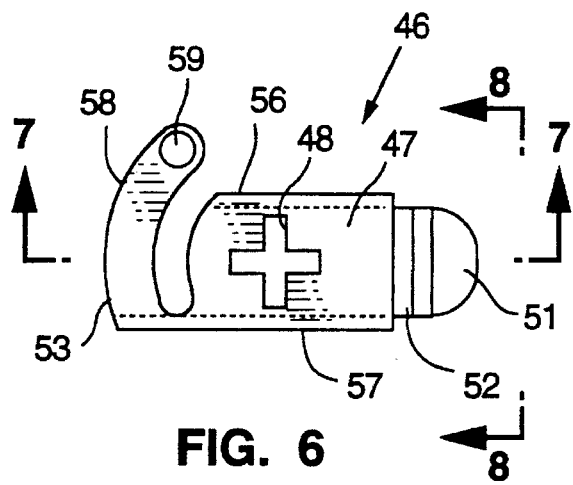
FIG. 6 is a top plan view of the metal clip portion of the fastener.
Figure 7:
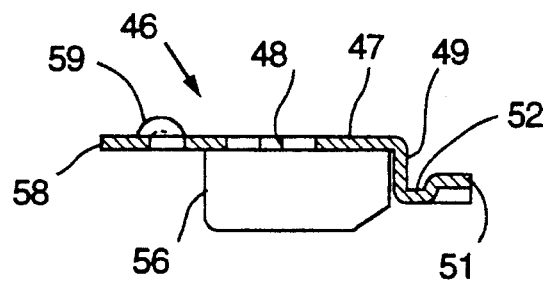
FIG. 7 is a sectional view taken substantially along the line 7—7 of FIG. 6.
Figure 8:
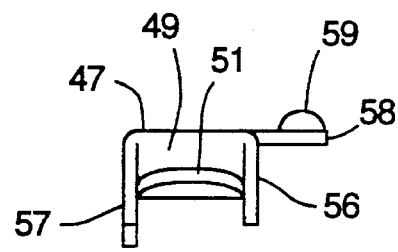
FIG. 8 is an end elevational view taken substantially along the line 8—8 of FIG. 6.
Figure 9:
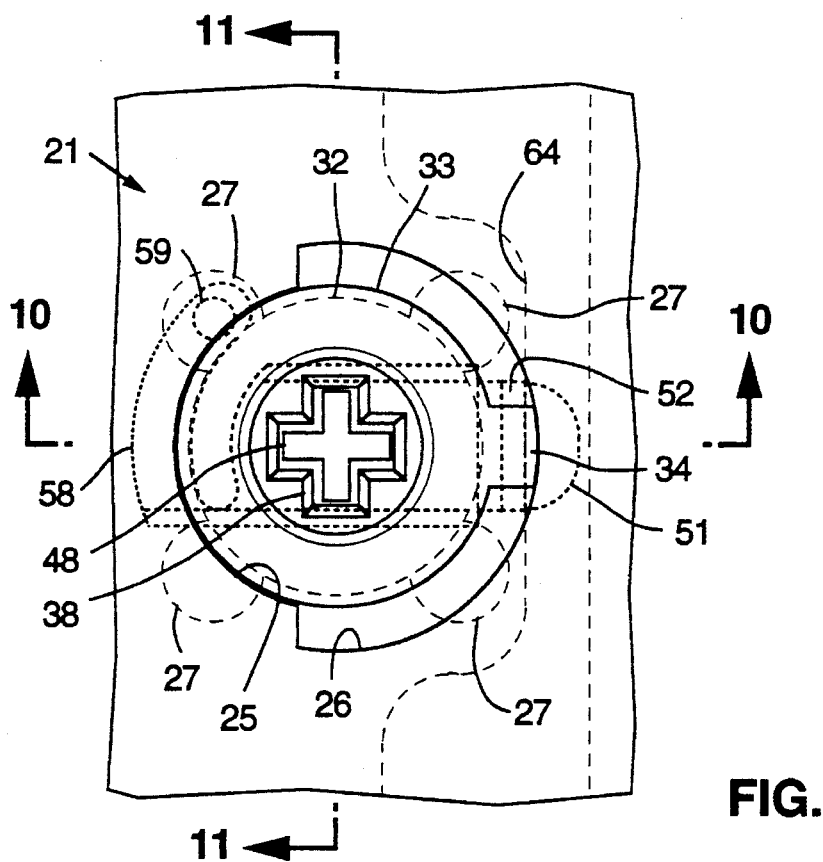
FIG. 9 is an enlarged top plan view of the fastener and panel in assembled condition.
Figure 10:
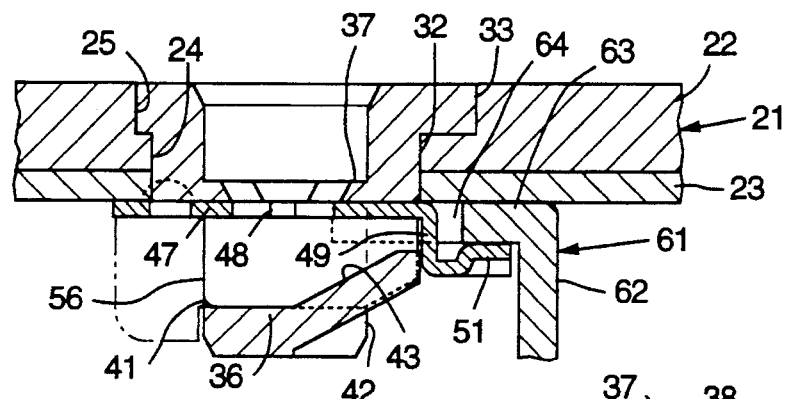
FIG. 10 is a sectional view taken substantially along the line 10—10 of FIG. 9.
Figure 11:
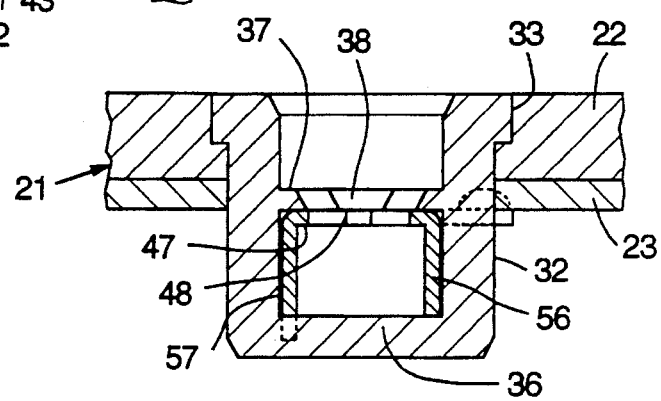
FIG. 11 is a vertical sectional view taken substantially along the line 11—11 of FIG. 9.
Figure 12:
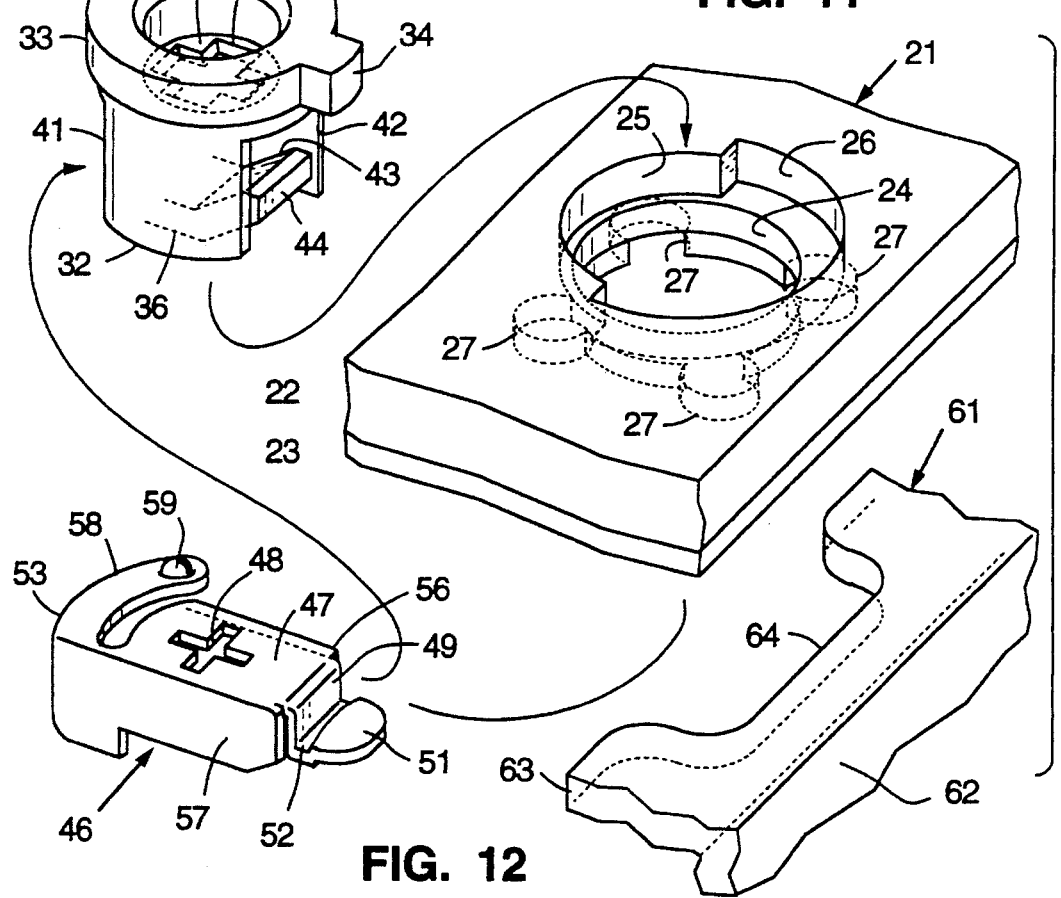
FIG. 12 is an exploded perspective view of the components of the fastener, panel, and a portion of the chassis.

Reference will now be made in detail to the preferred embodiments of the invention, examples of which are illustrated in the accompanying drawings. While the invention will be described in conjunction with the preferred embodiments, it will be understood that they are not intended to limit the invention to those embodiments. On the contrary, the invention is intended to cover alternatives, modifications and equivalents, which may be included within the spirit and scope of the invention as defined by the appended claims.

Panel 21 is shown in the accompanied drawings having an outer layer 22 and an inner layer 23, but it will be understood that only a single layer is required. A round hole 24 is formed in panel 21 and a counter bore 25 is formed at the outer surface of panel 21. Outward of counter bore 25 is an arcuate depression 26 which is slightly more than 180° in arcuate length. The underside of panel 21 is formed with four dimples 27 located at 90° angles to each other and equidistant from the center of hole 24. Generally speaking, one dimple 27 is located underneath each end of the arcuate depression 26 and the remaining two are diametrically opposed.

Plastic cap 31 as shown in FIGS. 3–5 has a hollow cylindrical portion 32 shaped to fit into the hole 24 and a peripheral flange 33 shaped to fit into the counter bore 25. At one point on the exterior of flange 33 is an indicator 34 projecting outwardly and shaped to fit into the arcuate depression 26. Turning of cap 31 is limited by the extent of depression 26, and the position of cap 31 at any time relative to the panel 21 is indicated by indicator 34.

Partially closing off the lower end of the hollow cylindrical portion 32 is bottom 36. Positioned across the bore in cylindrical portion 32 is a partition 37 formed with a cross slot 38 to receive a Phillips screwdriver blade. At diametrically opposed locations are substantially rectangular windows or openings 41, 42 in the wall of cylindrical portion 32. Slanted upwardly from bottom 36 and extending out through opening 42 is an upwardly outwardly slanted detent 43 having an outer end 44.

Fitting into cap 31 is a clip 46 preferably formed of spring metal. Clip 46 has a top or web 47 which fits immediately under portion 37 in the assembled condition of the parts and top 47 is formed with a cross slot 48 shaped to receive the blade of a Phillips screwdriver, the slot 48 being aligned with slot 38 when the parts are assembled. Preferably slot 38 is enlarged so that the screwdriver blade engages slot 48, which is less likely to break off since it is made of metal, whereas cap 31 is of softer plastic. Extending downward from one side of top 47 is a downward extension 49 which constitutes a shoulder against which end 44 bears in the assembled position of the parts. Extending outward from extension 49 and parallel to top 47 is a lock extension 51 formed with a transverse depression 52 which engages under the chassis flange as hereinafter explained. The end 53 of web 47 opposite extrusion 51 is curved coextension with the outside of cylindrical portion 32.

Extending downward from opposite side edges of top 47 are first side 56 and second side 57 which fit against the edges of the openings 41 and 42 in the assembled position of the parts and the lower edges of which engage the upper surface of bottom 36. Side 57 is formed with an arcuate arm 58 substantially co-planar with web 62 and the outer end thereof is formed with a dimple 59 which fits into any of the dimples 27 in the underside of the panel 21.

Web 47 engages the top edges of windows 41, 42, sides 56, 57 engages the vertical edges thereof and the bottom edges of sides 56, 57 engage bottom 36.

The chassis member 61 into which the fastener locks may be generally channel shaped having a web 62 perpendicular to panel 21. Upper flange 63 may be formed with a relief 64 so that any of the four dimples 27 on the underside of panel 21 are at all times exposed and may be engaged by dimple 59 of arm 58. It will be understood, of course, that if desired, no relief 64 need be formed in upper flange 63.

In use, cap 31 is inserted in hole 24, flange 33 fitting into counter bore 25, and indicator 34 being positioned in depression 26. Clip 43 is then inserted through the openings 41 and 42 until shoulder 49 snaps outside of end 44 of detent 43. Panel 21 is then placed in proximity to chassis member 61. A screwdriver is used first to turn the fastener so that indicator 34 is at one end or the other of arcuate depression 26. With the panel 21 engaging flange 63 and fastener in proximity to flange 63, the screwdriver is turned so that the indicator points toward chassis member 61 causing the extension 51 to fit under flange 63. The depression 52 in extension 51 applies pressure to flange 63 to hold the parts in engagement. Engagement of dimple 59 in one of dimples 27 prevents unintentional turning of the fastener.

In the accompanying drawings and above description, only one fastener has been mentioned. However, it will be understood that at least one additional fastener is used, preferably at the end of panel 21 opposite that shown and that the second fastener engages a flange (not shown) of the chassis remote from chassis member 61 illustrated.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed:

1. A rotatable fastener comprising a cap having a hollow cylindrical portion having an open top and a bottom, said cylindrical portion being formed with diametrically opposed, substantially rectangular, transverse openings, said bottom at least partially closing off said hollow cylindrical portion, and a detent connected to said bottom, and a clip having a web and opposed sides depending from said web, said web engaging top edges of said openings, said opposed sides engaging side edges of said openings and having bottom edges engaging said bottom, said clip having engagement means engaging said detent to hold said clip assembled on said cap after said clip has been inserted through said openings, said clip having a lateral locking extension, said clip having turning means for rotating said fastener about a longitudinal axis, whereby when said clip is inserted through said transverse openings in said cylindrical portion, said clip is turnable through approximately a quarter turn.

2. A fastener according to claim 1 in which said cap is of plastic and said clip is of spring metal.

3. A fastener according to claim 1 in which said turning means comprises a slot in said web which may be engaged by a blade extending through said open top to turn said fastener around said longitudinal axis.

4. A fastener according to claim 3 in which said cap is formed with a transverse partition immediately above said web formed with a second slot aligned with said first-mentioned slot.

5. A fastener according to claim 4 in which said second slot is enlarged relative to said first-mentioned slot.

6. A fastener according to claim 1 in which said detent slants upward-outward from said bottom and extends through one said opening and said engagement means comprises a downward shoulder on said web engaging a distal end of said detent.

7. A fastener according to claim 6 in which said locking extension extends outwardly of said shoulder parallel to said web.

8. A fastener according to claim 7 in which said locking extension is formed with a transverse depression.

9. A fastener according to claim 1 in which said cylindrical portion is formed with a peripheral flange adjacent said open top.

10. A fastener according to claim 1 in which said cylindrical portion is formed with a radially outwardly extending indicator to indicate the position of said fastener relative to said longitudinal axis.

11. A fastener according to claim 1 in which said clip is formed with an arcuate arm opposite said locking extension; said arm having a center of curvature at said longitudinal axis of said cylindrical portion.

12. A fastener according to claim 11 in which said arm comprises an extension of one said opposed sides of said clip and is substantially co-planar with said web.

13. A fastener according to claim 11 in which the distal end of said arm is formed with a dimple.

14. In combination a panel, a chassis flange and a fastener according to claim 1 to fasten said panel to said flange, said panel being formed with a hole through which said cylindrical portion fits, said fastener being capable of being turned relative to said panel about said longitudinal axis between a fastened position with said locking extensions engaging an underside of said chassis flange.

15. The combination of claim 14 in which the top surface of said panel is formed with a counterbore of said hole and said cylindrical portion is formed with a peripheral flange fitting into said counterbore.

16. The combination of claim 15 in which said panel is formed with an arcuate depression immediately outward of said counterbore and said fastener is formed with a radially extending indicator turnable in said arcuate depression and oriented relation to said locking extension whereby said indicator indicates the position of said locking extension.

17. The combination of claim 14 in which said locking extension is formed with a transverse depression whereby said locking extension tightly engages said chassis flange.

18. The combination of claim 16 in which said arcuate depression is slightly more than 180° in length, whereby when said indicator is centered in said depression, said locking extension engages said flange and said fastener may be turned ¼ turn to disengage said panel from said chassis flange.

19. The combination of claim 14 in which the undersurface of said panel is formed with a plurality of first dimples equidistant from the center of said hole and in which said clip is formed with an arcuate arm opposite said locking extension having a center of curvature at the center of said hole, said arm being formed with a second dimple engageable with any of said first dimples to detachably hold said fastener in a plurality of positions of rotation.

20. The combination of claim 18 in which an edge of said flange adjacent said fastener is formed with a relief to expose at least one of said first dimples.

21. A rotatable fastener comprising a cap having a hollow cylindrical portion having an open cap top and a bottom, said cylindrical portion being formed with a pair of transverse openings, said bottom at least partially closing off said hollow cylindrical portion, and a detent connected to said bottom, and a clip having a clip top and opposed sides depending from said clip top, said clip top engaging upper edges of said transverse openings, said opposed sides engaging side edges of said transverse openings and having bottom edges engaging said bottom, said clip having a portion configured to engage said detent to hold said clip assembled on said cap after said clip has been inserted through said transverse openings, said clip having a lateral locking extension, said clip being configured to accept means formed to transmit a rotational force to turn said clip about a longitudinal axis, whereby, when said clip is inserted through said transverse openings in said cylindrical portion, said clip is turnable through approximately a quarter turn.

* * * * *